Dec. 2, 1941.  A. PFEIFFER  2,265,045
PRESSURE GAUGE, AND MORE PARTICULARLY A BAROGRAPH
Filed Jan. 13, 1938  2 Sheets-Sheet 2

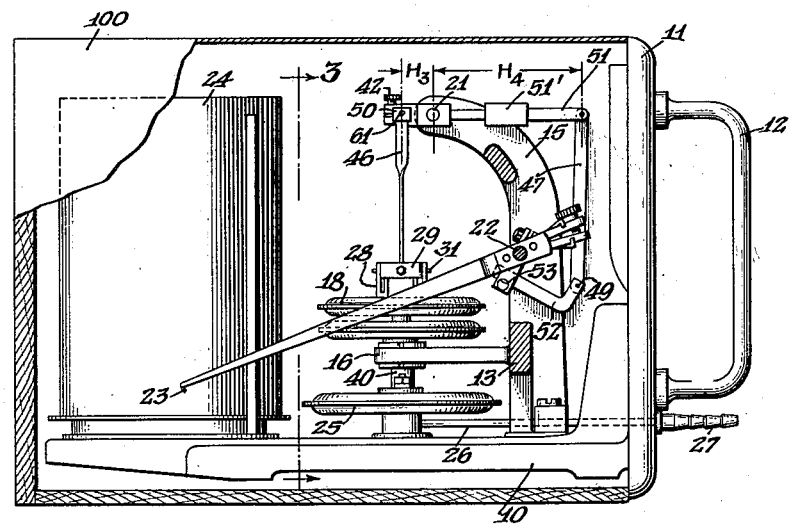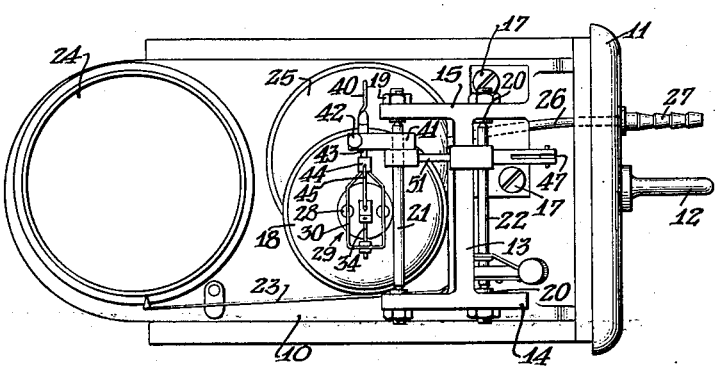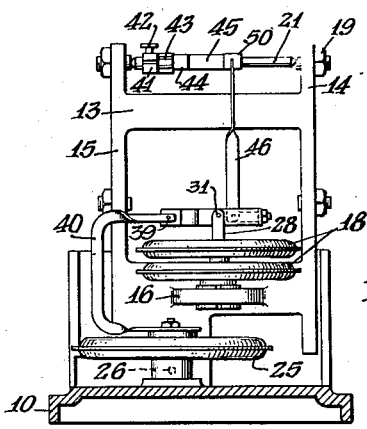

INVENTOR.
Alfred Pfeiffer
BY Walter S. Bleistein
ATTORNEY.

Patented Dec. 2, 1941

2,265,045

UNITED STATES PATENT OFFICE 2,265,045

PRESSURE GAUGE, AND MORE PARTICULARLY A BAROGRAPH

Alfred Pfeiffer, Berlin, Germany

Application January 13, 1938, Serial No. 184,777
In Germany September 10, 1934

7 Claims. (Cl. 73—4)

The present invention relates to a pressure gauge and, more particularly, to a barograph or recording altimeter for aircraft. It is a well known fact that frequently correct measuring of the atmospheric pressure and of other factors under the influence thereof is subject to considerable errors caused by the difference between the atmospheric pressure and the static pressure prevailing within a craft at the location of the measuring instrument. Such errors occur particularly in modern airplanes, since their travelling speeds have been increased. In order to obtain correct readings, it has been customary to enclose the measuring instruments or at least the organs effected by the air pressure, such as aneroid capsules or boxes, in an airtight chamber, and to connect the latter to a tube which, if suitably placed, takes up the static pressure undisturbed by the so-called relative wind. However, such airtight chambers have been found to be objectionable in various respects. An extremely high degree of air-tightness is required, which invariably has been found to fail after a certain time of operation in use. Further, it is difficult to secure the required air-tightness and, at the same time, provide easy accessibility to the individual parts within the chamber, particularly in recording instruments. Also, the airtight structure adds to the weight, which must be kept low for aircraft use.

Another source of error occurring in the indications provided by conventional instruments of the type under consideration results from the sensitivity of such devices to changes in temperature. This sensitivity causes faulty indications when the temperature during actual operation differs from that obtained during the calibration of the instrument. Such errors are of considerable importance due to the large fluctuation in the temperature of the air at different times and at different points or levels in space.

It is therefore an object of my present invention to provide an instrument for measuring pressure, such as an altimeter or barograph, which will be free from all, or at least some, of the aforesaid deficiencies of conventional instruments, as now known and constructed, and which will provide indications which are practically uninfluenced by changes in temperature and by the aerodynamically-caused vacuum which is produced in the body of a craft moving at high speed.

Another object of my invention is to provide an instrument of the aforesaid type which is so constructed that, when large numbers are produced in quantity manufacturing, all of the instruments will be of uniform quality.

The invention essentially consists in an instrument having adjustable means for eliminating the influences of changes in the temperature, and of disturbances of the static pressure, and means for adjusting the deflection of the pointer or recording pen, these means being so combined that the adjustment of one of them will not interfere with the effectiveness of the other.

Further objects and features of novelty of my invention will be apparent from the following description and the accompanying drawings which illustrate an embodiment thereof by way of example.

In the drawings:

Fig. 1 is a side elevation, partly in section, of an instrument constructed in accordance with my invention;

Fig. 2 is a top plan view thereof;

Fig. 3 is a sectional view along line 3—3 of Fig. 1, several parts being omitted;

Figure 4:
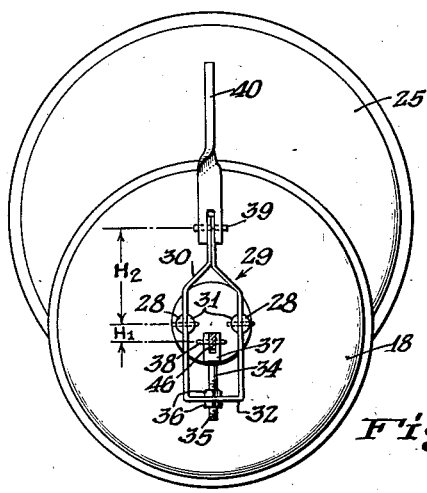
Fig. 4 is a top plan view, on a larger scale, of parts illustrated in Fig. 2.
Figure 6:
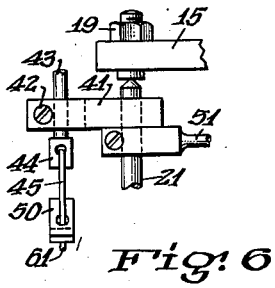
Fig. 6 is a top view of another part of the same instrument.
Figure 5:
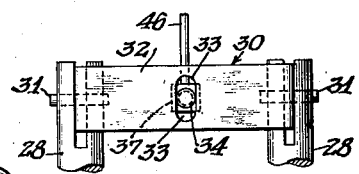
Fig. 5 is a front view of a part of the same instrument, on an enlarged scale.
Figure 7:
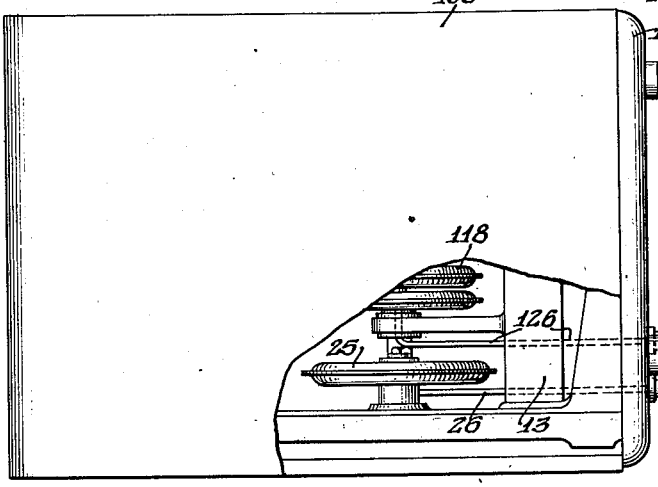
Figure 8:
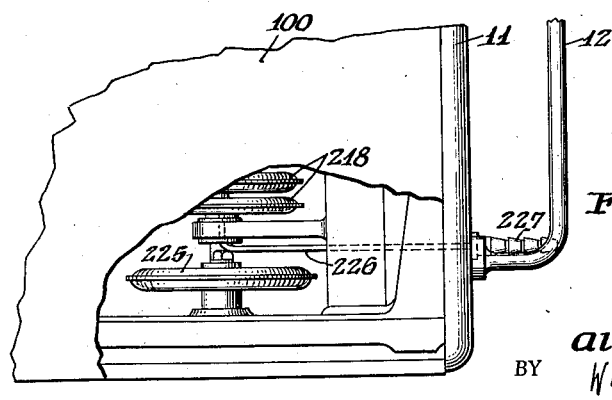

Figs. 7 and 8 respectively, are side elevation views of two instruments according to this invention, parts being broken away to show modified forms of the invention.

The instrument illustrated in Figs. 1 to 6 constitutes a barograph or recording altimeter, particularly designed for use in aircraft. Reference numeral 100 denotes a removable cover for protecting the instrument against injury. A base plate 10 is provided, to which is attached a front plate 11 having a handle 12, a frame 13 is mounted on the base plate 10 and comprises two upwardly-extending legs 14 and 15, and rearwardly-extending supporting arm 16. Frame 13 may be secured to the base plate by any suitable means, for example by screws 17. Supported by and above the arm 16 are two exhausted aneroid boxes or capsules 18 which are arranged in series, and the purpose and operation of which will be explained hereinafter. The legs 14 and 15 are provided, adjacent their upper ends, with aligned bearing means 19 for supporting a shaft 21, and at approximately their midpoints are provided with aligned bearings 20 which support a second shaft 22. A recording pen 23 is mounted on shaft 22 and is so disposed that the marking end thereof engages a recording paper on a rotatable cylinder 24 with interior clockwork, as is conventional in recording instruments. A third capsule 25 is mounted adjacent the base plate 10 and below the capsules 18. The interior of capsule 25 is connected by a pipe 26 to a conduit connecting device or fitting 27, to which may be attached a hose leading to a "static tube" (not shown). A static tube in the meaning of this specification is understood to be a tube which is so adapted and arranged as to receive and to transmit the true and undisturbed static pressure of the air surrounding the craft to which the instrument is applied.

Mounted on the upper surface of the upper aneroid box 18 are spaced supporting means, such as the pillars 28. Pillars 28 are provided with aligned pivot means 31 for pivotally supporting a differential device which has two actuated portions and an operating portion, and which is denoted generally by the numeral 29. This differential device 29 is preferably formed as a lever 30 in the shape of an open frame having spaced side wall members which are connected at their one end by a front wall 32, their other ends being brought together, as clearly illustrated in Fig. 4, to be pivotally connected at 39 to the upper end of a connecting member 40, the lower end of which is rigidly secured to the upper surface of capsule 25. Each of the side wall members of the differential lever device 29 is pivotally supported in one of the pillars 28. The front wall 32 of the lever 30 is provided with a vertically elongated aperture 33 through which protrudes one end of a pin 34, the major portion of which is disposed within the frame of the differential lever device 30. The protruding end of the pin 34 is screw-threaded to receive the nuts 36 which are arranged on the opposite faces of the front wall 32 of the lever device and which may be tightened against the front wall in order to rigidly attach the pin in a desired position with respect to the lever. The rear end of the pin, within the frame of the lever device, is provided with a head 37 with a pivot means 38. The actuated portions of the differential lever are defined by the pivots 31 and 39, and its operating portion is defined by pivot 38. There is, however, the possibility of making pivot 31 or 39 the operating portion, and the other pivots respectively, the actuated portions. The purpose of this device will appear hereinafter.

Mounted adjacent one end of the shaft 21 which, as stated hereinbefore, is carried by the arms 14 and 15 and which is disposed above and at right angles to the pivotal support of the differential device 29, is a clamp 41 which extends in a radial direction from the shaft. The outer end of the clamp 41 is constructed and arranged to receive the end of a shaft 43 which extends parallel to and spaced outwardly from the shaft 21 and which terminates in a supporting head 44 to which is attached one end of a bi-metallic strip 45, the opposite end of which is provided with a head 50 to which the upper end of a connecting rod 46 is pivotally attached by a pivot pin 61. The described parts are so arranged and the sizes and proportions thereof are so made that the end 50 of the bi-metallic bar 45 is disposed just above the head 37 on the pin 34. The connecting rod 46 extends vertically downward from the end 50 of the bi-metallic strip and the lower end of the connecting rod is pivotally connected to the head 37 on the pin 34. This construction is clearly illustrated in the drawings, particular reference being had to Fig. 6. Rigidly connected to shaft 21 is one end of a rod 51, such rod extending from the shaft 21 in a direction which is preferably opposite to the direction in which the clamp 41 extends from shaft 21. A counterpoise 51' may be provided on lever 51 in order to balance the various movable members. It will be seen that arm 51 and clamp 41 with shaft 43 and bi-metallic bar 45 will act as a lever of the first order which is fulcrumed on the shaft 21 and that any movement of head 50 will be transmitted through the bi-metallic strip 45, clamp 41 and shaft 21 to arm 51, and vice versa. In Fig. 1 of the drawings the distance from the pivot pin 61 in the end of 50 of the bi-metallic strip 45 to the axis of shaft 21 is designated as lever arm H3, while the effective length of rod 51 is designated as lever arm H4. It will be apparent that the ratio of the lever arms H3 and H4 is variable and depends upon the deflections of the bi-metallic strip, with changes in temperature, toward or away from the axis of shaft 21.

Means are provided by the invention for causing the movements of the lever arm 51 to operate the recording pen 23 and such means comprise an arm 52, one end of which is rigidly connected by a clamp 53 to rotatable shaft 22 on which is also carried the recording pen. The arm 52 extends from shaft 22 in such a direction and for such a distance that its end may be connected, as by means of a connecting rod 47, to the outer free end of lever arm 51.

It will be apparent from the described construction that any movement of the differential lever 30, such as a movement thereof caused by expansion or contraction of the capsules 18 and 25 will be transmitted through connecting rod 46, bi-metallic strip 45, clamp 41, lever arm 51, connecting rod 47, arm 52 and shaft 22 to the recording pen 23 and will therefore cause a recording movement of such pen which will be proportional to the movement of the differential lever. It will also be apparent that the amount of the movement transmitted from the differential lever 30 to the lever arm 51 will be dependent upon the distance between the end 50 of the bi-metallic strip 45 and the axis of shaft 21, whereby the movement of the recording pen 23 will be dependent, at least in part, upon the temperature of the atmosphere surrounding the bi-metallic strip. Finally, the degree of the deflection of recording pen 23 will be also dependent upon the ratio of the length of lever arm 52 to the length of lever arm 51. Means are provided for altering the active length of the arm 52 and also of the connecting member 47, in order to adjust the ratio of the deflection of the recording pen 23 in relation to the movements of lever arm 51. Such means are given by clamping part 52 in part 53 at various positions.

In order to describe the operation of the instrument it may be assumed that an instrument as described hereinbefore is located in the fuselage of a high speed airplane, and that the capsule 25 is connected by means of fitting 27 and a hose to a "static tube" so mounted outside the fuselage as to receive the undisturbed static pressure of the atmosphere. If, now, the airplane ascends, the aneroid capsules 18 will expand and raise the pivots 31 of the differential lever 30. Owing to the fact, however, that the static air pressure within the fuselage of an aircraft which is travelling at high speed is not the same as that of the atmosphere surrounding the craft, the upward movement of the pivots 31 will not give a correct measure of the true alteration of the atmospheric pressure, and, hence, of the altitude of the aircraft. The pressure in the fuselage, being lower than the static pressure of the atmosphere, will cause the indication of too great an altitude if the expansion of the capsules 18 were directly transmitted to the recording pen 23. The indication is corrected, in instruments, according to the present invention, by means operated by the capsule 25 and the differential device 29, together with their associated parts, in the following manner. The interior of the capsule 25 is subjected to the true static pressure of the atmosphere through the static tube, fitting 27 and pipe 26 and, exteriorly, is subjected to the disturbed static pressure in the fuselage, which also acts upon the aneroid capsules 18. Due to the speed of the aircraft, the air pressure within the fuselage is less than the static pressure of the surrounding air, causing capsule 25 to expand and thus, through the connecting member 40, to raise the rear end of the differential lever 30. Consequently, pivot 38 being on the opposite side of pivots 31 from pivot 39 will be lowered with respect to pivots 31 or, more correctly, with respect to the position which pivot 38 would take if capsule 25 were inoperative. It will be apparent that, due to the lowering of pivot 38 the stroke of connecting member 46 due to expansion of capsules 18 will be reduced. Therefore, any possibility of excessive movement of the recording pen by reason of improper movement of capsules 18 will be compensated for by the lowering of pivot 38 by movement of capsule 25.

Pivot 38 will always move in proportion to the actual static pressure of the atmosphere, provided first that the capsules 18 and 25 have similar characteristics of expansion and contraction in proportion to pressure, which means that the expansion of both capsules follows the same law, either linear or exponential, wherein, however, the increments of the expansion of the capsule 25 may be different from, as e. g. in the case of the illustrated embodiment greater than that of capsule 18, and provided second that the leverage of the differential device 29, i. e. the distance between pivots 39 and 31 and between pivots 38 and 31 are suitably chosen according to such difference in the increments of the expansion of the capsules. This follows from the fact that the aneroid capsules 18 respond to the changes in the pressure in the fuselage as compared with the vacuum in the capsules 18, while the capsule 25 responds to changes in the pressure on the fuselage as compared with the static pressure of the atmosphere. The algebraic sum of these responses, as provided by the described means, including the differential device 29, indicates the change in the static pressure of the atmosphere as compared with the vacuum of the aneroid capsules, the atmospheric pressure in turn being a measure for the altitude of the aircraft. Although I have shown, in the illustrated embodiment, two capsules 18 and one capsule 25, it will be understood that in each case any suitable number of capsules 18 and any suitable number of capsules 25 may be used, provided that the combined capsules 18 and the combined capsules 25 have the required characteristics as stated heretofore.

With respect to the means provided by the invention for compensating for changes in temperature of the surrounding air, it will be observed that such temperature changes will cause the density of the air to vary and that the reaction of those elements of the device which are responsive to atmospheric pressure will therefore be incorrect, inasmuch as the density of the air being affected by temperature, will not be a true measure of altitude. Furthermore, the lengths of the various levers and connecting members are also subject to the influences of the temperature, and alterations of these lengths, caused by the temperature changes, may decrease or increase the error introduced by the capsules affected by the same temperature changes. The resulting error may be compensated by causing the resultant movement of the two pressure-responsive devices to be transmitted to the recording pen through means which will vary this resultant movement in accordance with the temperature either increasing or decreasing it and which will simultaneously vary the resultant leverage between the capsules and the recording pen in order to compensate for all influences due to temperature changes.

Any errors which might ocur due to the changes in the temperature of the surrounding air are compensated by means of the bi-metallic strip 45. This strip bends in one direction or the other with increase or decrease in temperature, thereby altering the distance of pivot pin 61 from the axis of shaft 21. In this manner the ratio of the levers which transmit movement of pivot 38 to the recording pen 23 is altered with changes in temperature. Provided that the materials of the bi-metallic strip and its dimensions are properly chosen, practically complete compensation of errors due to temperature changes may be obtained. It will be noted that the means provided for effecting such compensation do not interfere with the operation of the pressure-responsive devices or with the operation of the members forming the differential device.

In order to adjust the instrument properly before it is used, it may be placed in an airtight container, the attaching member 27 being open to the atmosphere outside of the container so that the interior of capsule 25 is under atmospheric pressure. Thereafter, and an imitation of the pressure disturbance in the body of fuselage of a craft moving at high speed, the pressure within the container is reduced to a corresponding extent. By adjusting the nuts 36, to loosen pin 34, the pin is then shifted in axial direction until the ratio of the lever arm defined by the pivots 31 and 38 ($H_1$) to the lever arm defined by pivots 31 and 39 ($H_2$) is equal to the ratio of the movements of the capsules 18 and 25, respectively, due to a predetermined change of pressure. The attainment of the required adjustment may be noted by the fact that a decrease of the pressure in the container has no influence upon the recording pen 23. Thereafter, the instrument having been calibrated for the static pressure prevailing in the adjustment room, must be tested in the same manner at lower air pressure. Should it be found on such further testing, that the first adjustment does not affect an accurate calibration for all pressures, the compensation for the static pressure, secured as described hereinbefore, may be further adjusted by shifting pin 34 in the slot 33, i. e. in a direction at right angles to the plane of frame 30. The shifting of pin 34 in this manner causes the arms of the originally straight line lever 39, 31, 38 to be deformed to include an angle of less than 180°.

The shifting of pin 34 in slot 33, and the consequent changes in the angular relation of the parts of the differential lever, will cause the pivot 38 to assume a different vertical position with respect to the pivots 31. Thus, after such relative movement between the pivots 38 and 31, any movement of capsule 18 or 25 which is transmitted to connecting rod 46 through the differential lever will be either increased or decreased by reason of such relative movement. In this manner a further and more accurate adjustment of the deflection of recording pen 23 to compensate for disturbances of the static pressure may be secured.

The described structure permits adjustment of the instrument to compensate for temperature changes and such adjustment may be effected without interfering with the insensitiveness of the instrument to disturbances of the static pressure, which is secured as described hereinbefore. For the purpose of adjusting the instrument to compensate for changes in temperature, the instrument may be repeatedly exposed to different temperatures, as by putting it in a heating or cooling chamber. The bi-metallic strip 45 is adjusted until the position of pen 23 is invariable for all temperatures. This adjustment of the bi-metallic strip may be accomplished by loosening screw 42 of clamp 41, then turning pin 43 as required, and tightening screw 42 again.

Finally, a desired and suitable rate of the deflection of the arm of the recording pen may be secured by making lever arm 51 of a suitable and proper length and by adjusting the effective length of lever arm 52 and also of connecting member 47, if necessary. It will be noted that such adjustments cannot affect the described adjustments of the instrument to render it insensitive to disturbances of the static pressure and to alterations of the temperature. Therefore, an essential feature of the present invention is the progressive sequence of three means for adjusting the instrument to compensate for variable factors, each of which adjustable means operates the subsequent one, these adjusting means being a differential means for compensating for pressure disturbances, a thermostatic means for compensating for changes in temperature and which is acted upon by said differential means, and an adjustable lever means for securing a desired rate of deflection of the indicating or recording member, and being operated by and through said thermostatic means.

In the modified form of the invention disclosed in Fig. 7, the instrument is essentially the same as that illustrated in Fig. 1. In distinction, however, to the capsules 18 of Fig. 1, capsules 118 of the device disclosed in Fig. 7 are not exhausted, and a pipe 126 connects the interior of these capsules to a hose attachment fitting 127 at the front wall 11, this arrangement being similar to that of the parts 25, 26 and 27 of Fig. 1. If, now, fitting 127 is connected to a dynamic pressure tube 70, and fitting 27 is connected to a static pressure tube 71, as diagrammatically shown by dash lines, the instrument will indicate the dynamic pressure head as a measure of the air speed of the craft. Such indications will be exact and uninfluenced by disturbances of the static pressure at the location of the instrument or by changes in the temperature, as with the indications of the static pressure and, hence, of the altitude obtained with the instrument of Fig. 1.

In the modification disclosed in Fig. 8 capsule 225 is exhausted, while capsules 218 are not exhausted. The interiors of capsules 218 are connected to a hose attachment fitting 227 by means of pipe 226. This instrument is adapted to provide absolute measurements of highly variable pressures. If, for example, fitting 227 is connected to the compression chamber of a motor, the instrument will exactly indicate the compression of the motor, independent of the altitude of flight and of changes in the temperature.

Many alterations and modifications of the illustrated forms of my invention will be apparent to those skilled in the art, and may be practised without departing in any way from the scope of the invention. For example, the relative position of the pivots 31, 38 and 39 may be altered without changing the effectiveness of the differential lever or interfering with the essence of the invention. However, the described arrangement for the compensation of the static pressure has been found to be most advantageous, as it does not cause the deflection of the recording pen to be decreased below corresponding deflections in similar instruments as known to the prior art, and, consequently, no additional means are required for increasing the movement of the recording pen, provided the stroke of capsule 25 is suitably chosen. On the contrary, the illustrated arrangement of the differential lever for the compensation of the static pressure inherently effects a certain desirable increase of the stroke capsules 18, in transmitting such stroke to the recording pen.

What I claim is:

1. An instrument for measuring the pressure of a gaseous medium, comprising two capsule members having substantially similar characteristics as to expansibility in relation to differences of interior and exterior pressure thereof, both of said members being exteriorly subjected to the air pressure at the location of said instrument, one of said members being adapted to be interiorly subjected to the pressure of said gaseous medium, the other one of said members being adapted to be interiorly subjected to the pressure in relation to which the pressure of said medium is to be measured, a differential lever comprising a pivot and two lever arms extending laterally of said pivot in opposite directions, at least one of said lever arms being adjustable as to length, said pivot being connected to one of said capsules, one of said lever arms being operably connected to the other one of said capsules, and an indicator means operably connected to the other one of said lever arms.

2. An instrument according to claim 1 in which at least one of said lever arms is adjustable to vary the angle between said lines connecting the pivot center with those points of the lever arms where the latter are connected to said other capsule and to said indicating means respectively.

3. An instrument for measuring the pressure of a gaseous medium, comprising two capsule members having substantially similar characteristics as to expansibility in relation to differences of interior and exterior pressures thereof, both of said members being exteriorly subjected to the air pressure at the location of said instrument, one of said members being adapted to be interiorly subjected to the pressure of said gaseous medium, the other one of said members being adapted to be interiorly subjected to the pressure in relation to which the pressure of said medium is to be measured, indicator means, a differential lever including a frame having a rear portion, two side portions and a front portion having a vertical slot therein, said side portions being pivotally connected to one of said capsules and said rear portion to the other one of said capsules, and an elongated member passed through said front wall slot, said elongated member having a pivot head, and means for securing said elongated member to said front portion in such a manner as to permit adjustment of the distance of said pivot head from the pivots of said side portions, said pivot head being connected to said indicator means.

4. An instrument for measuring the pressure of a gaseous medium, comprising two movable members each responsive to differences of pressures acting thereupon, both said members being subjected in one direction to the pressure of the air at the location of the instrument, one of said members being adapted to be subjected in another direction to the pressure of said gaseous medium, and the other member being adapted to be subjected in another direction to that pressure in relation to which the pressure of said gaseous medium is to be measured, differential means for mechanically subtracting the numerical values of the movement of one of said members from that of the other one, means for compensating the operation of said differential means for changes in temperature, said last mentioned means comprising a lever device including an adjustable bi-metallic element responsive to temperature changes, and indicator means, said differential means being operably connected to said lever device and said lever device being operably connected to said indicator means.

5. An instrument for measuring the pressure of a gaseous medium, comprising a first means for compensating for air pressure disturbances occurring at the location of the instrument, a second means for compensating for changes in temperature, an indicator, two capsule members, and a third means for adjusting the rate of the deflection of said indicator, said first means comprising a differential device including two actuated and one operating portions, said actuated portions being operable respectively by said capsule members one of which being responsive to the pressure to be measured and the other one being responsive to a pressure which is used as a basis of comparison, said second means comprising a lever device including a bi-metallic element, said third means comprising a lever adjustable as to its leverage, said operating portion of said first means being connected to said lever of said second means, said lever of said second means being connected to said lever of said third means and said lever of said third means being connected to said indicator.

6. An instrument for measuring the pressure of a gaseous medium, comprising a first means for compensating for air pressure disturbances occurring at the location of the instrument, a second means for compensating for changes in temperature, an indicator, a first expansible capsule member responsive to the pressure to be measured, a second expansible capsule member responsive to a pressure which is used as a basis for comparison, and a third means for adjusting the rate of the deflection of said indicator, said first means comprising a differential device including a pivot and two lever arms one of which is adjustable as to length and as to the angle between lines connecting said pivot with the operative ends of said lever arms, one of said lever arms and said pivot being adapted to be moved respectively by said first and said second capsule member, said second means comprising a lever including an adjustable bi-metallic element, said third means comprising a lever adjustable as to its length, said other arm of said differential lever being connected to said lever of said second means, the lever of said second means being connected to the lever of said third means, and said lever of said third means being connected to said indicator.

7. An instrument for measuring the dynamic pressure of an air current, comprising a first and a second expansible capsule member, both of said members being exteriorly subjected to the static air pressure within said instrument, a static tube, a dynamic pressure tube, means for connecting the interior of said first member to said static tube, means for connecting the interior of said second member to said dynamic pressure tube, a differential lever comprising a pivot and two lever arms, said pivot being connected to said second capsule member, one of said lever arms being operably connected to said first capsule member, and an indicator means operably connected to the other one of said lever arms.

ALFRED PFEIFFER.